(12) United States Patent
Athalye et al.

(10) Patent No.: US 8,853,958 B2
(45) Date of Patent: Oct. 7, 2014

(54) DRIVING CIRCUITS FOR SOLID-STATE LIGHTING APPARATUS WITH HIGH VOLTAGE LED COMPONENTS AND RELATED METHODS

(71) Applicant: Cree, Inc., Durham, NC (US)

(72) Inventors: Praneet Athalye, Morrisville, NC (US); Qingcong Hu, Morrisville, NC (US); Michael Walters, Apex, NC (US); Eric Menzel, Raleigh, NC (US); Michael James Harris, Cary, NC (US)

(73) Assignee: Cree, Inc., Durham, NC (US)

( * ) Notice: Subject to any disclaimer, the term of this patent is extended or adjusted under 35 U.S.C. 154(b) by 161 days.

(21) Appl. No.: 13/662,618

(22) Filed: Oct. 29, 2012

(65) Prior Publication Data

US 2013/0127353 A1   May 23, 2013

Related U.S. Application Data

(60) Provisional application No. 61/562,616, filed on Nov. 22, 2011.

(51) Int. Cl.
*H05B 37/02* (2006.01)
*H05B 33/08* (2006.01)

(52) U.S. Cl.
CPC ........ *H05B 33/0815* (2013.01); *H05B 33/0812* (2013.01); *Y02B 20/46* (2013.01)
USPC ............................ 315/283; 315/207; 315/194

(58) Field of Classification Search
USPC .............. 315/194, 200 R, 207, 224, 193, 283
See application file for complete search history.

(56) References Cited

U.S. PATENT DOCUMENTS

| 4,581,542 | A | 4/1986 | Steigerwald |
| 5,015,836 | A | 5/1991 | Van Antwerp |
| 5,446,366 | A | 8/1995 | Bassett et al. |
| 6,381,151 | B1 | 4/2002 | Jang |
| 6,621,235 | B2 | 9/2003 | Chang |
| 7,345,894 | B2 | 3/2008 | Sawtell et al. |
| 8,587,211 | B2 * | 11/2013 | Melanson ..................... 315/247 |
| 2002/0163371 | A1 | 11/2002 | Hall et al. |
| 2009/0261748 | A1 | 10/2009 | McKinney et al. |
| 2010/0007999 | A1 | 1/2010 | Iwata |
| 2010/0045210 | A1 | 2/2010 | Hariharan |
| 2010/0123978 | A1 | 5/2010 | Lin et al. |

(Continued)

OTHER PUBLICATIONS

International Search Report Corresponding to International Application No. PCT/US2012/065533; Date of Mailing: Feb. 5, 2013; 11 Pages.

(Continued)

*Primary Examiner* — Don Le
(74) *Attorney, Agent, or Firm* — Myers Bigel Sibley & Sajovec, P.A.

(57) ABSTRACT

A driving circuit for a solid state lighting apparatus includes a full wave rectifier configured to rectify an alternating current (AC) input voltage signal to generate a rectified input signal, a boost conversion circuit configured to receive the rectified input signal and responsively generate a direct current (DC) output voltage signal and to supply the output voltage signal to a solid state light source, and a boost control circuit coupled to the boost conversion circuit and configured to cause the boost conversion circuit to operate in a constant power mode.

28 Claims, 9 Drawing Sheets

(56) References Cited

U.S. PATENT DOCUMENTS

| | | | |
|---|---|---|---|
| 2010/0164406 A1* | 7/2010 | Kost et al. | 315/307 |
| 2010/0308738 A1 | 12/2010 | Shteynberg et al. | |
| 2010/0309689 A1 | 12/2010 | Coulson | |
| 2011/0074292 A1 | 3/2011 | Maehara | |
| 2011/0095691 A1* | 4/2011 | Nakajo et al. | 315/133 |
| 2011/0148200 A1 | 6/2011 | Burns et al. | |
| 2011/0149614 A1 | 6/2011 | Stracquadaini | |
| 2011/0248640 A1 | 10/2011 | Welton | |
| 2011/0279044 A1 | 11/2011 | Maiw | |
| 2012/0013259 A1* | 1/2012 | Jin | 315/185 R |
| 2012/0319604 A1* | 12/2012 | Walters | 315/200 R |
| 2013/0162149 A1 | 6/2013 | Van de Ven et al. | |
| 2013/0241430 A1* | 9/2013 | Lee et al. | 315/224 |
| 2013/0307415 A1 | 11/2013 | Ni | |
| 2014/0043877 A1* | 2/2014 | Ishii | 363/84 |
| 2014/0049181 A1* | 2/2014 | Kelly et al. | 315/224 |
| 2014/0091724 A1* | 4/2014 | Palmer | 315/201 |

OTHER PUBLICATIONS

ST Microelectronics, L6561 Power Factor Corrector Datasheet, Jun. 2004, retrieved Mar. 2, 2013 at URL: http://www.st.com/web/en/resource/technical/document/datasheet/CD00001174.pdf.

Notification of Transmittal of the International Search Report and the Written Opinion of the International Searching Authority, or the Declaration, PCT/US13/58682, Date of Mailing: Feb. 7, 2014; 21 pages.

Notification Concerning Transmittal of International Preliminary Report on Patentability, PCT/US2012/065533, Date of Mailing: May 27, 2014, 9 pages.

Notification of Transmittal of the International Search Report and the Written Opinion of the International Searching Authority, or the Declaration, PCT/US2013/067211, Date of Mailing: Mar. 27, 2014, 13 pages.

* cited by examiner

DRIVING CIRCUITS FOR SOLID-STATE LIGHTING APPARATUS WITH HIGH VOLTAGE LED COMPONENTS AND RELATED METHODS

CROSS REFERENCE TO RELATED APPLICATIONS

The present application claims the benefit of and priority to U.S. Provisional Patent Application No. 61/562,616, filed Nov. 22, 2011, entitled "DRIVING CIRCUITS FOR SOLID-STATE LIGHTING APPARATUS WITH HIGH VOLTAGE LED COMPONENTS AND RELATED METHODS," the disclosure of which is hereby incorporated herein by reference in its entirety.

FIELD

The present application relates to lighting apparatus and methods and, more particularly, to driving circuitry for solid-state lighting apparatus and methods.

BACKGROUND

Solid-state lighting arrays are used for a number of lighting applications. For example, solid-state lighting panels including arrays of solid-state light emitting devices have been used as direct illumination sources, for example, in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers. Typically, a solid-state light emitting device generates light through the recombination of electronic carriers, i.e. electrons and holes, in a light emitting layer or region. A solid-state light emitting device may include, for example, a packaged light emitting device including one or more light emitting diodes (LEDs).

Cree, Inc. produces a variety of recessed downlights, such as the LR-6 and CR-6, which use LEDs for illumination. Solid-state lighting panels are also commonly used as backlights for small liquid crystal display (LCD) screens, such as LCD display screens used in portable electronic devices, and for larger displays, such as LCD television displays.

Some attempts at providing solid-state lighting sources have involved driving an LED or string or group of LEDs using a rectified AC waveform. However, because the LEDs require a minimum forward voltage to turn on, the LEDs may turn on for only a part of the rectified AC waveform, which may result in visible flickering, may undesirably lower the power factor of the system, and/or may increase resistive loss in the system.

Other attempts at providing AC-driven solid-state lighting sources have involved placing LEDs in an anti-parallel configuration, so that half of the LEDs are driven on each half-cycle of an AC waveform. However, this approach requires twice as many LEDs to produce the same luminous flux as using a rectified AC signal.

SUMMARY

A driving circuit for a solid state lighting apparatus according to some embodiments includes a full wave rectifier configured to rectify an alternating current (AC) input voltage signal to generate a rectified input signal, a boost conversion circuit configured to receive the rectified input signal and deliver power responsively generate a direct current (DC) output voltage signal and to supply the output voltage signal to a solid state light source at a voltage higher than a peak voltage of the rectified input signal, and a boost control circuit coupled to the boost conversion circuit and configured to cause the boost conversion circuit to draw a substantially constant power from the rectified input signal and transfer the power to the solid state light source at a voltage level defined by the solid state light source.

The boost control circuit may be configured to operate in an open loop control mode such that operation of the boost conversion circuit is not controlled in response to a level of the output voltage signal.

The boost control circuit may be configured to generate a current reference for controlling the boost conversion circuit in response to the rectified input signal.

The boost control circuit may be configured to operate in a constant on time boundary conduction mode and/or in a constant off time continuous conduction mode.

The boost conversion circuit may include a boost inductor configured to receive the rectified input signal, a diode coupled to the boost inductor, a boost capacitor coupled to the diode, and a switch coupled to the boost inductor and the diode. Operation of the switch is controlled by the boost control circuit. The boost inductor may include an auxiliary winding, and the boost control circuit is coupled to the auxiliary winding of the boost inductor and configured to generate a current reference in response to a voltage developed across the auxiliary winding of the boost inductor.

The boost control circuit may be configured to draw bias power from a source other than the auxiliary winding of the boost inductor.

The boost conversion circuit may include a boost inductor configured to receive the rectified input signal, a diode coupled to the boost inductor, a boost capacitor coupled to the diode, and a MOSFET switch including a drain terminal coupled to the boost inductor and the diode, a source terminal coupled to the boost control circuit, and a gate terminal coupled to the boost control circuit. The driving circuit may be configured to draw bias power from the drain terminal of the MOSFET switch.

A solid state lighting apparatus according to some embodiments includes a solid state lighting source including a solid state light emitting device, and a driving circuit coupled to the solid state lighting source. The driving circuit may include a full wave rectifier configured to rectify an alternating current (AC) input voltage signal to generate a rectified input signal, a boost conversion circuit configured to receive the rectified input signal and responsively generate a direct current (DC) output voltage signal and to supply the output voltage signal to a solid state light source, and a boost control circuit coupled to the boost conversion circuit and configured to cause the boost conversion circuit to operate in a constant power mode in which the boost conversion circuit attempts to supply a constant power to the solid state light source regardless of variation of a level of the input voltage signal.

The solid state lighting source may include a first light emitting diode component configured to emit light having a first color and a second light emitting diode component configured to emit light having a second color that is different from the first color. The first and second light emitting diode components are connected in a current mirror configuration.

The first and second light emitting diode components are connected in parallel and/or in series.

The solid state lighting source may include a first transistor and a second transistor coupled in a current mirror configuration with base contacts of the respective transistors coupled to a common node, coupled to a cathode of the second light emitting diode component, and coupled to a collector of the first transistor. A collector of the second transistor is coupled to an anode of the second light emitting diode component and to a cathode of the first light emitting diode component.

The solid state lighting source may include a first transistor and a second transistor coupled in a current mirror configuration with base contacts of the respective transistors coupled to a common node and coupled to a collector of the second transistor, and a third transistor having an emitter coupled to the common node and a base coupled to a collector of the first transistor. A collector of the third transistor is coupled to an anode of the second light emitting diode component and to a cathode of the first light emitting diode component, and the cathode of the second light emitting diode component is coupled to the collector of the first transistor.

The solid state lighting device may include a plurality of light emitting diodes configured to emit light having a first color and coupled a current mirror configuration.

A method of generating an input voltage signal for powering a solid state light source according to some embodiments includes rectifying an alternating current input voltage to form a rectified input signal, boosting the rectified input signal and converting the rectified input signal to direct current to form an output voltage signal, and supplying the output voltage signal to the solid state light source. Boosting the rectified input signal may be performed in a constant power mode.

Boosting the rectified input signal may be performed in an open loop control mode.

The method may further include generating a current reference for controlling the boosting of the rectified input signal in response to the rectified input signal.

Boosting of the rectified input signal may be performed using a boost control circuit configured to operate in a constant on time boundary conduction mode.

Boosting of the rectified input signal may be performed using a boost control circuit configured to operate in a constant off time continuous conduction mode.

A driving circuit for a solid state lighting apparatus according to some embodiments includes a voltage boost circuit including a boost inductor, a boost diode coupled to the boost inductor, an output capacitor coupled to the boost diode and a switch coupled between the boost inductor and ground; a first output terminal coupled to the output capacitor and configured to be connected to an anode terminal of a solid state lighting circuit; a second output terminal configured to be connected to a cathode terminal of the solid state lighting circuit; and a controller coupled to the switch and configured to control operation of the switch in response to an inductor current through the boost inductor and a load current through the solid state lighting circuit.

The controller may be configured to turn off the transistor switch when the current through the boost inductor reaches a predetermined threshold.

The driving circuit may further include a zero cross detection circuit configured to generate a zero cross detection signal in response to detecting a zero crossing of the current through the boost inductor, wherein the controller is configured to turn the transistor switch on in response to the zero cross detection signal.

The controller may be configured to clamp the current through the boost inductor at a predetermined level.

The controller may be configured to clamp the current through the boost inductor around a peak of the input voltage signal for at least 10 degrees of a conduction cycle of the input voltage level, in some embodiments for at least 20 degrees of the conduction cycle of the input voltage level, and in some embodiments for at least 30 degrees of the conduction cycle of the input voltage level.

The driving circuit may further include a discharge circuit coupled to the first output terminal and configured to discharge a voltage on the output capacitor in response to a loss of input voltage.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
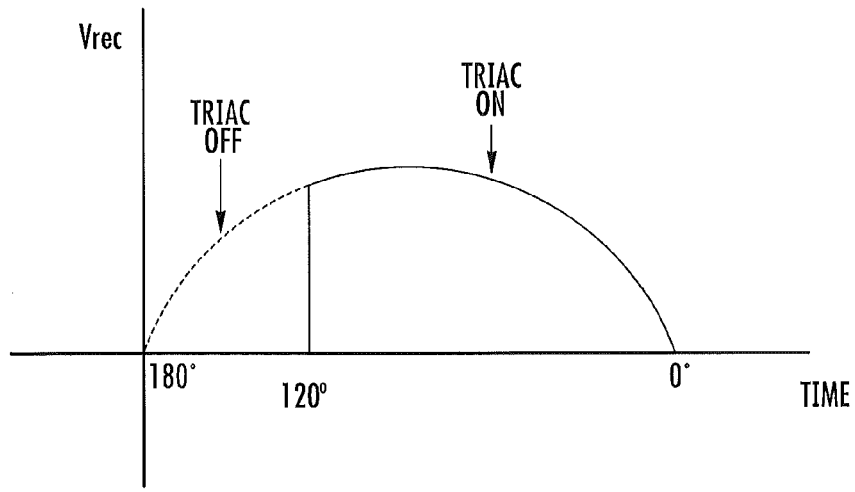
FIG. 1 illustrates triac-based phase cut dimming of an AC-driven lighting apparatus.

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

In a circuit for driving an array of light emitting diodes from an AC source, it is desirable to maintain the power factor of the circuit as close to unity (1) as possible. The power factor of an AC electric power system is defined as the ratio of the real power flowing to the load over the apparent power in the circuit, and is a dimensionless quantity that can be expressed as a number between 0 and 1 or as a percentage between 0% and 100%. A non-linear load, such as a load that includes a rectifier, distorts the wave shape of the current drawn from the source. This causes the apparent power flowing in the circuit to be greater than the real power delivered to the load, which reduces the power factor of the circuit.

A circuit with a low power factor draws more current than a circuit with a high power factor for the same amount of useful power transferred to the load. The energy lost in an electrical circuit is proportional to $I^2R$. Thus, an increase in current due to a low power factor can greatly, and undesirably, increase power loss in a circuit.

Active or passive power factor correction may be used to raise the power factor of a circuit. An active power factor correction circuit, or active PFC, is an electric circuit that controls the amount of power drawn by a load in order to obtain a power factor as close as possible to unity. In most applications, an active PFC controls the input current of the load so that the current waveform is in phase with the main voltage waveform. The purpose of making the power factor as close to unity as possible is to make the load circuitry that is power factor corrected appear purely resistive. This enables the most efficient delivery of electrical power from the voltage supply line to the load.

In the case of a switched-mode power supply, a boost converter can be used for active power factor correction. The boost converter attempts to maintain a constant DC bus voltage on its output while drawing a current that is always in phase with and at the same frequency as the AC line voltage, thereby maintaining a high power factor.

A driving circuit for a solid state light apparatus including high voltage LEDs according to some embodiments is provided. The driving circuit may include a power-factor-corrected (PFC boost converter that operates in constant power mode. In a constant power mode, a boost conversion circuit receives a rectified input signal and delivers power to a solid state light source at a voltage higher than a peak voltage of the rectified input signal. A boost control circuit coupled to the boost conversion circuit causes the boost conversion circuit to draw a substantially constant power from the rectified input signal and transfer the power to the solid state light source at a voltage level defined by the solid state light source.

LED tuning and compensation circuits/methods may also be included. A driving circuit according to some embodiments may provide a solution that is low-cost, highly efficient and performs very well naturally (without additional circuitry) with phase-cut dimming circuits.

Phase cut dimming circuits were originally designed for use with traditional incandescent light fixtures. In phase cut dimming, the leading or trailing edge of the line voltage is manipulated to reduce the root mean square (RMS) voltage provided to the light. When used with incandescent lamps, this reduction in RMS voltage results in a corresponding reduction in current and, therefore, a reduction in power consumption and light output. As the RMS voltage decreases, the light output from the incandescent lamp decreases.

Phase cut dimming is illustrated in FIG. 1, which is a graph of a rectified input AC waveform that has been passed through a phase-cut dimmer including a triac. Over a 180° half cycle of the rectified input waveform, the triac is controlled to be active (on) for only a portion of the cycle. For example, in the graph of FIG. 1, the triac is on for 120° of the 180° half cycle. For the first 60° of the half cycle, the input voltage signal is clamped at zero volts. For the final 120° of the half cycle, the input voltage follows the rectified input voltage signal. By controlling the length of time that the triac is on, the RMS voltage provided to the light can be controlled.

When phase cut dimming is utilized, the duty cycle of the resulting rectified waveform is changed. This change in duty cycle, if sufficiently large, is noticeable as a decrease in light output from an incandescent lamp. The "off" time may not result in flickering of the incandescent lamp because the filament of an incandescent lamp has some thermal inertia and will remain at a sufficient temperature to emit light even during the "off" time when no current flows through the filament.

Recently, solid state lighting systems have been developed that provide light for general illumination. These solid state lighting systems utilize light emitting diodes or other solid state light sources that are coupled to a power supply that receives the AC line voltage and converts that voltage to a voltage and/or current suitable for driving the solid state light emitters. Typical power supplies for light emitting diode light sources include linear current regulated supplies and/or pulse width modulated current and/or voltage regulated supplies.

A power converter for a solid state lighting apparatus is disclosed in commonly assigned U.S. patent application Ser. No. 13/207,204, filed Aug. 10, 2011, entitled "Bias Voltage Generation Using A Load In Series With A Switch," the disclosure of which is incorporated herein by reference.

Solid state lighting devices with temperature compensation circuits are disclosed in commonly assigned U.S. patent application Ser. No. 13/152,772, filed Jun. 3, 2011, entitled "Lighting Devices with Individually Compensating Multi-Color Clusters," the disclosure of which is incorporated herein by reference.

In the general illumination application of solid state light sources, one desirable characteristic is to be compatible with existing dimming techniques. In particular, dimming that is based on varying the duty cycle of the line voltage may present several challenges in power supply design for solid state lighting. Unlike incandescent lamps, LEDs typically have very rapid response times to changes in current. This rapid response of LEDs may, in combination with conventional dimming circuits, present difficulties in driving LEDs. However, a circuit according to some embodiments may function well even with phase-cut dimming.

Figure 2:
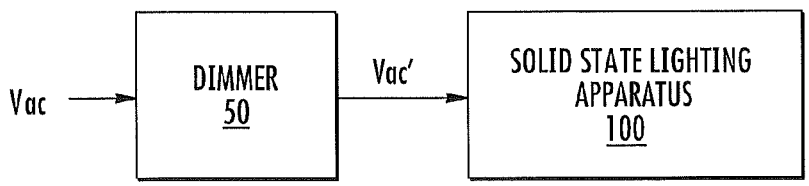
FIGS. 2 and 3 are block diagrams illustrating a solid state lighting apparatus according to some embodiments.
Figure 3:
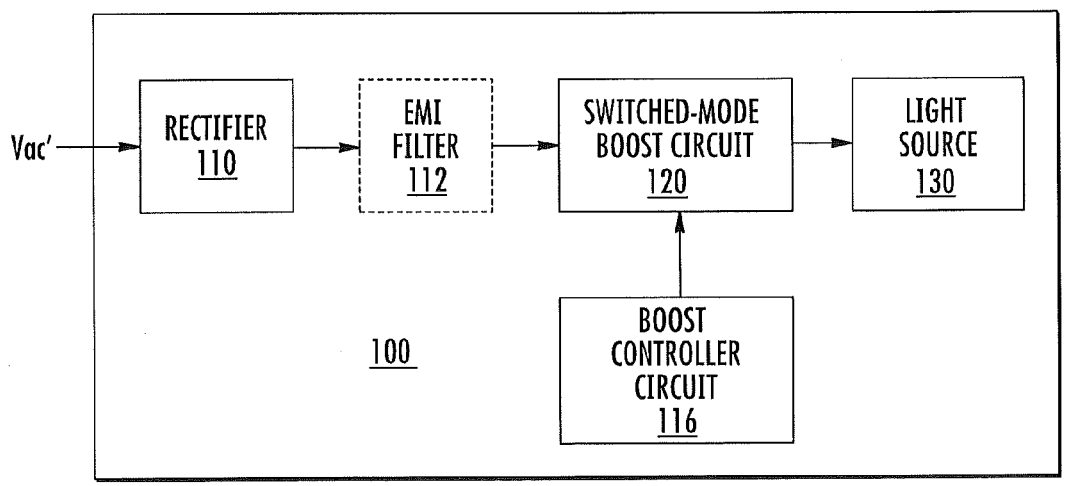
Figure 4:
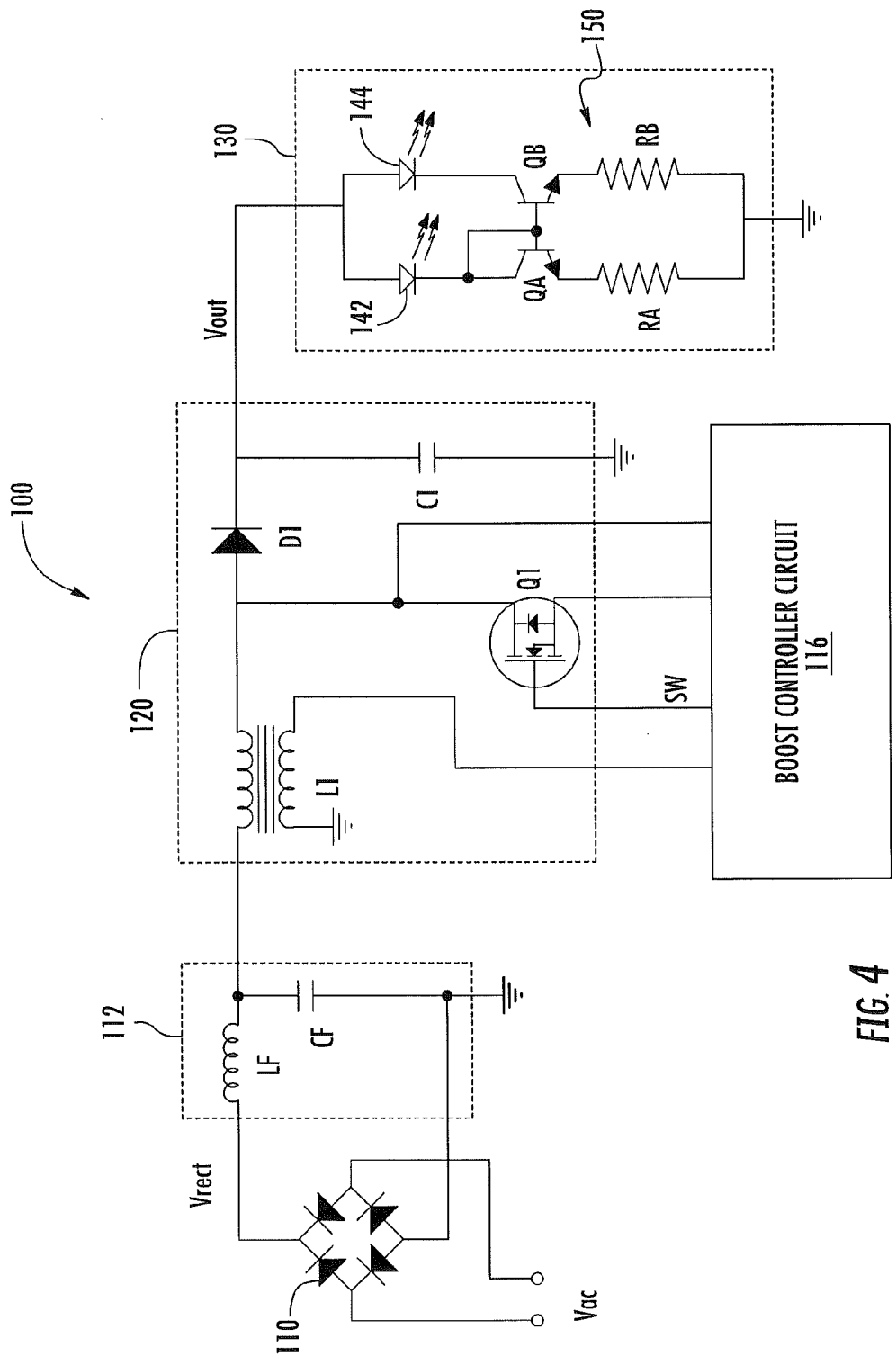
FIG. 4 is a circuit diagram illustrating a solid state lighting apparatus according to some embodiments.

Referring to FIGS. 2, 3 and 4, a solid state lighting apparatus 100 according to some embodiments is provided. The solid state lighting apparatus 100 may be powered by an alternating current (AC) voltage signal Vac. The AC voltage signal Vac may be passed though a dimmer, such as a phase cut dimmer 50 that generates a phase cut AC signal Vac' that is provided to the solid state lighting apparatus 100. Accordingly, the signal that is input to the solid state lighting apparatus may include a pure sine wave, a phase cut sine wave, or some other AC waveform.

Referring to FIG. 3, the solid state lighting apparatus 100 includes a rectifier 110 that is configured to receive the AC signal Vac'. The rectifier 110 may be a full-wave bridge rectifier as shown in FIG. 3. The output of the rectifier 110, which may be a full-wave rectified AC voltage signal, is provided to a switched-mode boost circuit 120 that is controlled by a boost controller circuit 116. An electromagnetic interference (EMI) filter 112 may optionally be provided between the rectifier 110 and the boost circuit 120. In response to the rectified AC signal, the switched-mode boost circuit 120 generates a DC voltage that is supplied to a light source 130.

Referring to FIG. 4, the EMI filter 112 may include a series inductor LF and a shunt capacitor CF provided at an input to the switched-mode boost circuit 120. The EMI filter 112 is a low pass filter that filters electromagnetic interference from the rectified line voltage.

In particular embodiments, the switched-mode boost circuit 120 includes a boost inductor L1, a switch Q1, a boost diode D1 and a boost or output capacitor C1. The switch Q1 may be a MOSFET switch. The boost inductor L1 may include a transformer having a primary winding and an auxiliary winding. The primary winding of the boost inductor L1 is coupled at one end to the input of the switched-mode boost circuit 120 and at the other end to the anode of the boost diode D1 and the drain of the switch Q1.

Operation of the switched mode boost circuit 120 is controlled by a switch signal SW generated by boost controller circuitry 116. The boost controller circuitry 110 is coupled to the gate, drain and source of the switch Q1. In addition, the boost controller circuitry 116 is coupled to the auxiliary winding of the boost inductor L1. However, the boost controller circuitry 116 may not draw bias or housekeeping power from the auxiliary winding of the boost inductor L1.

Figure 5A:
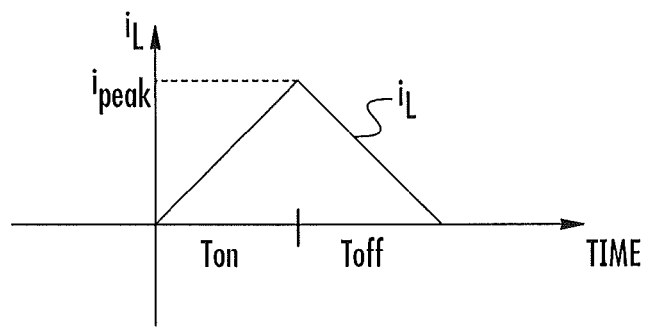
FIGS. 5A and 5B illustrate inductor current in a driving circuit for a solid state lighting apparatus according to some embodiments.
Figure 5B:
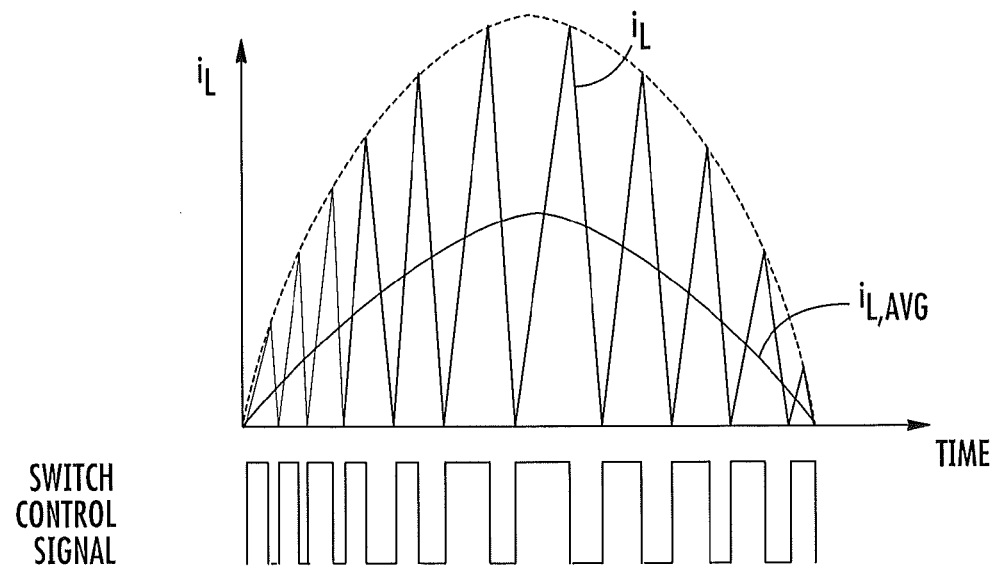

In one embodiment the boost controller circuitry 116, which may be implemented, for example, using a TPS92210 Single-Stage PFC Driver Controller for LED Lighting manufactured by Texas Instruments, can be configured in a constant on time-boundary conduction mode. FIGS. 5A and 5B are graphs of the inductor current $i_L$ that passes through the boost inductor L1 in response to the control signal SW. Referring to FIGS. 4 and 5A, the switch Q1 is turned on for a fixed time (Ton) allowing for a ramp up of the current $i_L$ in the inductor L1 up to a peak value that is determined by the input voltage level. The switch Q1 is turned off and the inductor current ramps down to zero while supplying current to the output capacitor through D1. The controller 116 detects when the current falls to zero and initiates another turn-on of Q1. The peak input current in a switching period is given by Vin*Ton/L1 which is proportional to Vin. As shown in FIG. 5B, although the switching frequency varies over the line period, the average input current $i_{L,AVG}$ may remain near sinusoidal and may achieve a power factor close to unity.

Figure 6:
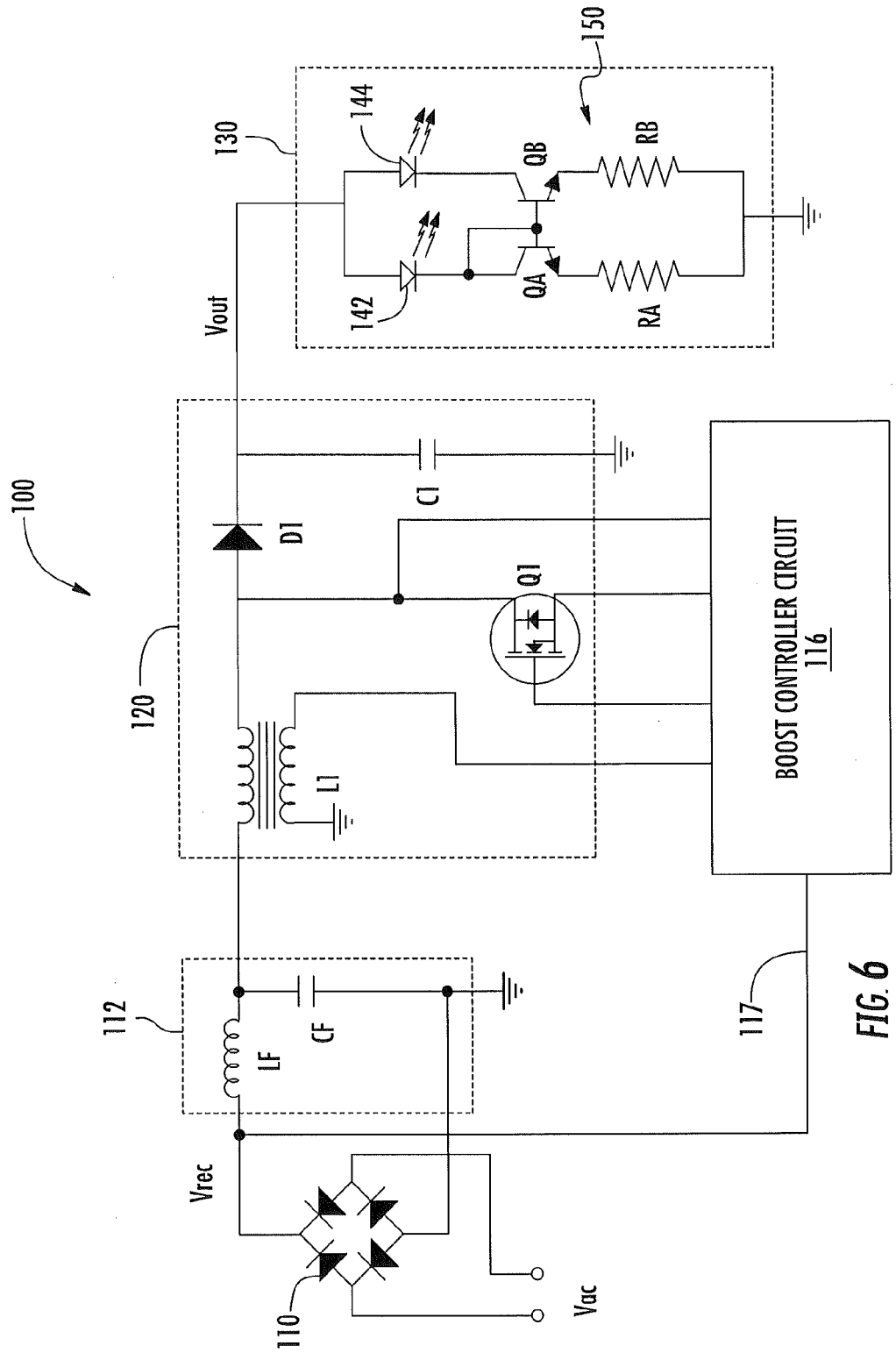
FIG. 6 is a circuit diagram illustrating a solid state lighting apparatus according to further embodiments.
Figure 7A:
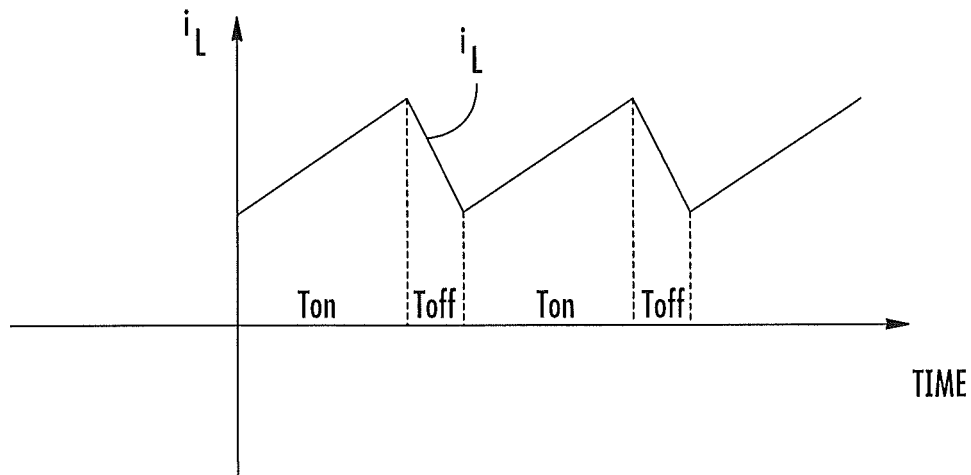
FIGS. 7A and 7B illustrate inductor current in a driving circuit for a solid state lighting apparatus according to further embodiments.
Figure 7B:
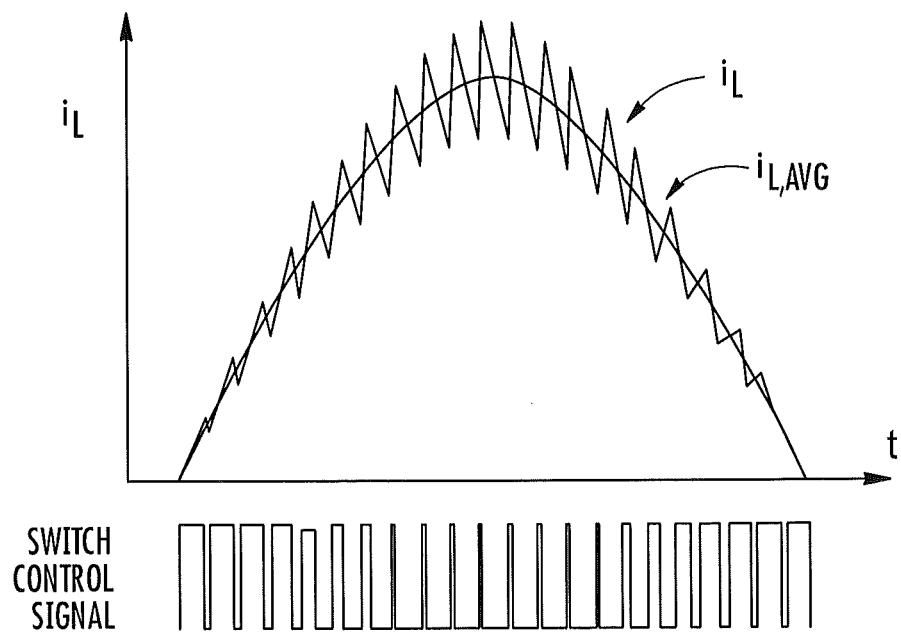

In another embodiment illustrated in FIG. 6, a boost controller, such as an L6562 PFC controller manufactured by STMicroelectronics, can be used in constant off-time continuous conduction mode to implement the boost controller circuitry 116. In this mode, the current reference for the switch current is obtained from the input waveform via the line 117. The switch Q1 is operated with a fixed off time as shown in FIG. 7A. As shown therein, the inductor current $i_L$ increases while the switch Q1 is on and decreases during the fixed off time Toff. FIG. 7B illustrates that the average inductor current $i_L$ follows the shape of the reference voltage obtained from the input waveform.

In another embodiment, the average inductor current is sensed with a current sense resistor (which may be included in the boost controller circuit 116) and is controlled to follow the sinusoidal input voltage with a controller IC such as an IRF1155S manufactured by International Rectifier. Any of these controllers can be operated in constant power mode by operating them in open loop and fixing the controller reference, such as on-time or error-amplifier output, to a value that determines the power. The power transferred to the output is dumped into the load LEDs, which define the output voltage and in doing so define the output current.

Referring again to the embodiments of FIG. 4, although a connection is shown from the auxiliary winding of L1 to the boost control circuit 116, a power factor compensating (PFC) boost converter for an LED driver circuit according to some embodiments may not draw bias or housekeeping power from the auxiliary winding of the boost converter. Rather, the boost control circuit 116 may in some embodiments draw the auxiliary power from bottom of the LED string or from the drain node of the switch. Moreover, a PFC boost converter for an LED driver according to some embodiments may not use feedback from the LED voltage (VOUT) to control the converter.

The boost circuit 120 steps up the input voltage using basic components, which keeps the cost of the circuit low. Moreover, additional control circuitry can be minimal and the EMI filter 112 can be small.

The boost circuit 120 may achieve high efficiency by boosting the output voltage to a high level (for example about 170V or more). The load currents and circuit RMS currents can thereby be kept small, which reduces the resulting $I^2R$ losses. An efficiency of 93% can be achieved compared to 78-88% efficiency of a typical flyback or buck topology.

Still referring to FIG. 4, the light source 130 includes a pair of high voltage LED components including a first high voltage LED component 142 and a second high voltage LED component 144. The first high voltage LED component 142 may include a plurality of LEDs coupled in a series, parallel or series/parallel configuration that generate blue shifted yellow (BSY) colored light in response to an input current. BSY emitters are described, for example, in commonly assigned U.S. Pat. No. 7,213,940, and U.S. Publication No. 2008/0309255, the disclosures of which are incorporated herein by reference.

The second high voltage LED component 144 may include a plurality of LEDs coupled in a series, parallel or series/parallel configuration that generate red colored light in response to an input current. In general, the red light generated by the second high voltage LED component 144 may have a dominant wavelength that is about 600 nm to about 630 nm. When BSY light from the first high voltage LED component 142 is combined with red light from the second high voltage LED component 144, the resulting combination may generate white or near-white light having a hue that is similar to an incandescent source with high color rendering. The actual color of the combined light output by the first and second high voltage LED components 142, 144 will depend on the relative intensities of light emitted by the first and second high voltage LED components 142, 144. Thus, the color of light emitted by the solid state lighting apparatus 100 can be tuned by tuning the relative level of current flowing through the respective high voltage LED components 142, 144.

The high-voltage LED components 142, 144 may include multi junction monolithic LEDs or multi-chip components that can be defined to have nominal voltage greater than or equal to 20 V. Multi junction monolithic LEDs are described, for example, in commonly assigned U.S. patent application Ser. No. 13/190,094, entitled "High Voltage Low Current Surface Emitting Light Emitting Diode," filed Jul. 25, 2011, the disclosure of which is incorporated herein by reference. An example of a multi-chip LED is a 46V, 22 mA Cree XT-E HV LED manufactured by Cree, Inc., Durham, N.C. An example of a multi-chip component is a multi-chip CXA package manufactured by Cree, Inc., Durham, N.C. Having a high voltage LED makes it easier and cost effective to build a string configuration that has a forward voltage rating of 170V or more (i.e., greater than maximum input voltage of the boost converter).

Still referring to FIG. 4, the light source 130 includes a current mirror 150 that can set and/or adjust the ratio of the currents between the first high voltage LED component 142 and the second high voltage LED component 144. That is, the light source 130 can adjust the relative level of current flowing through the BSY LEDs and the red LEDs, which changes the hue of the combined light emitted by both of the components.

The boost converter 120 typically operates from 120V AC, 60 Hz (169 V peak) input and converts it to around 200V DC output. Different output voltages within a reasonable range (170V to 450V) can be achieved based on various circuit parameters and control methods while maintaining a reasonable performance. If a 230V AC input is used (such as conventional in Europe), the output may be 350V DC or higher.

In one embodiment the boost converter is driven in constant power mode in which the output LED current is determined by the LED voltage. In constant power mode, the boost controller circuitry may attempt to adjust the controller reference in response to changes in the input voltage so that the operating power remains constant. For example, in some embodiments, the boost converter may be configured to supply a substantially constant power to an LED load in the presence of voltage fluctuations of the input voltage of up to 10% from a nominal voltage level. In some embodiments, a boost converter may supply a power level that is within 10% of a desired power level in the presence of voltage fluctuations of the input voltage up to 5% from a nominal voltage level, and in some cases in the presence of voltage fluctuations of the input voltage up to 5% from a nominal voltage level.

When operated in constant power mode, a power factor correcting boost voltage supply appears nearly as an incandescent/resistive load to the AC supply line or a phase cut dimmer. In case of a resistive load, the input current has the same shape as the input voltage, resulting in a power factor of 1. In constant power mode the boost converter circuit 120 and light source 130 may offer an equivalent resistance of approximately 1440 Ohms at the input, which means 10 W of power is drawn from the input at 120V AC. If the input voltage is dropped to 108V AC, the power will drop to approximately 8.1 W. As the AC voltage signal on the input line is chopped (e.g. by a phase cut dimmer), the power throughput gets reduced in proportion and the resulting light output by the light source 130 is dimmed naturally. Natural dimming refers to a method which does not require additional dimming circuitry. Other dimming methods need to sense the chopped rectified AC waveform and convert the phase-cut information to LED current reference or to a PWM duty cycle to the dim the LEDs. This additional circuitry adds cost to the system.

A boost converter circuit 120 according to some embodiments does not regulate the LED current or LED voltage in a feedback loop. That is, the boost converter may not use feedback from the LED voltage (VOUT) to control the converter. However both of these inputs could be used for protection such as over-voltage protection or over-current protection. Since the boost converter operates in open loop, it appears as a resistive input. When a PWM converter controls its output voltage or output current and when the input voltage is chopped with a dimmer, it will still try to control the output to a constant value and in the process increase the input current.

The solid state lighting apparatus 100 uses LED string voltages that are very high compared to conventional fixtures. In some embodiments, the forward voltage of the LED string(s) in the light source 130 may be at least 170V. In some embodiments, the forward voltage of the LED string(s) in the light source 130 may be between about 170V and about 450V or about 180V and about 240V. In particular embodiments, the forward voltage may be about 200V, and in some embodiments the forward voltage of the LED string(s) in the light source 130 may be as high as 450V or even higher.

The current mirror 150 may have a number of different configurations. For example, referring to FIG. 4, the current mirror 150 may include first and second transistors QA, QB and first and second resistors RA, RB. The transistors QA, QB may include NPN bipolar junction transistors. Bases of the transistors QA, QB may be coupled to one another and to the cathode of the first high voltage LED component 142. Collectors of the transistors QA, QB may be coupled to respective cathodes of the first and second high voltage LED components 142, 144, and emitters of the transistors QA, QB may be coupled to respective resistors RA, RB.

In this configuration, current coming in the light source 130 is split between the two high voltage LED components based on the current mirror values of RA and RB. RA and RB may include single resistors and/or combinations of several resistors. RA and/or RB may include compensating resistors, such as negative temperature coefficient (NTC) and/or positive temperature coefficient (PTC) thermistors that change the current distribution between the first and second high voltage LED components 142, 144, based on temperature. The resistors RA, RB may be laser trimmed to set the color point.

It will be appreciated that the current mirror 150 shown in FIG. 4 could be replaced by a digitally addressable ASIC that is configured to perform the same or similar function.

Figure 8A:
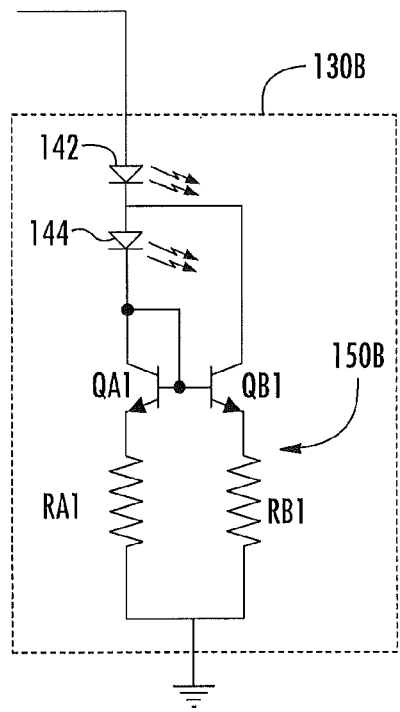
FIGS. 8A, 8B and 8C illustrate current mirror circuits for a solid state lighting apparatus according to various embodiments.

Referring to FIG. 8A, a different light source 130B and current mirror configuration 150B is illustrated. As shown therein, the first and second high voltage LED components 142, 144 are connected in series in a single string, with the cathode of the first high voltage LED component 142 coupled to the anode of the second high voltage LED component 144 (although it will be appreciated that the order of the high voltage LED components 142, 144 could be reversed).

Still referring to FIG. 8A, the current mirror 150B may include first and second transistors QA1, QB1 and first and second resistors RA1, RB1. The transistors QA1, QB1 may include NPN bipolar junction transistors. Bases of the transistors QA1, QB1 may be coupled to one another and to the cathode of the second high voltage LED component 144. Collectors of the transistors QA1, QB1 may be coupled to respective cathodes of the first and second high voltage LED components 142, 144, and emitters of the transistors QA1, QB1 may be coupled to respective resistors RA1, RB1.

The first and second high voltage LED components 142, 144 are connected to form a single string, but some current passing through the string is pulled away from QA1 depending on the relative resistance values of resistors RA1 and RB1. The relative values of RA1 and RB1 may depend on the desired color point and/or temperature of operation. There is power loss in QB1 when current is pulled away from the string, but the single string configuration reduces the number of LEDs needed to reach a desired forward operating voltage. The configuration shown in FIG. 4 may be particularly suitable for lower light output products.

Figure 8B:
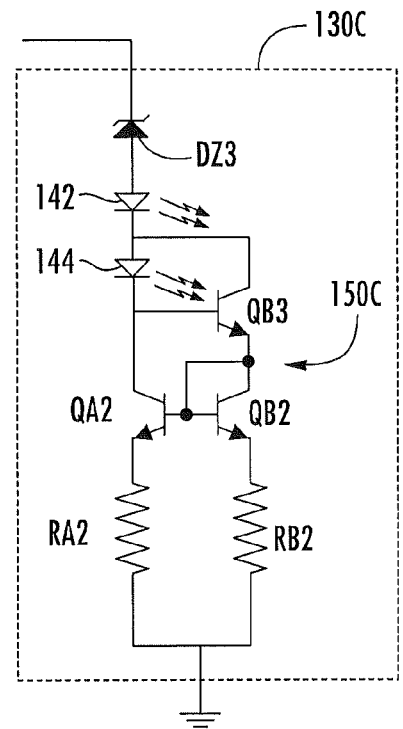

A third configuration including a light source 130C and a current mirror 150C is shown in FIG. 8B. In particular, the configuration shown in FIG. 8B uses a Wilson current mirror.

The current mirror 150C includes first, second and third transistors QA2, QB2 and QB3 and first and second resistors RA2, RB2. The transistors QA2, QB2 and QB3 may include NPN bipolar junction transistors. Bases of the transistors QA2, QB2 are coupled to one another and to the emitter of transistor QB3. Collectors of the transistors QA2, QB3 may be coupled to respective cathodes of the first and second high voltage LED components 142, 144. The collector of the transistor QB2 is coupled to the emitter of the transistor QB3. The emitters of the transistors QA2, QB2 are coupled to respective resistors RA1, RB1. A Zener diode DZ3 is coupled in series with the first and second high voltage LED components 142, 144.

The transistors QA2 and QB2 may be very stable. When current is pulled away from the series string, loss is dissipated in the transistor QB3. QB3 may additionally have a Zener diode or a resistor (not shown) in series with collector also to share the power loss.

The Zener diode DZ3 is provided used to add voltage to the string, although it dissipates power. In one embodiment the voltage on the first high voltage LED component (including BSY LEDs) may be about 120V, the voltage on the second high voltage LED component (including red LEDs) may be about 64V, and the voltage on the Zener diode DZ3 may be about 27V.

A high voltage LED component used in some embodiments can be made as one LED component package.

Figure 8C:
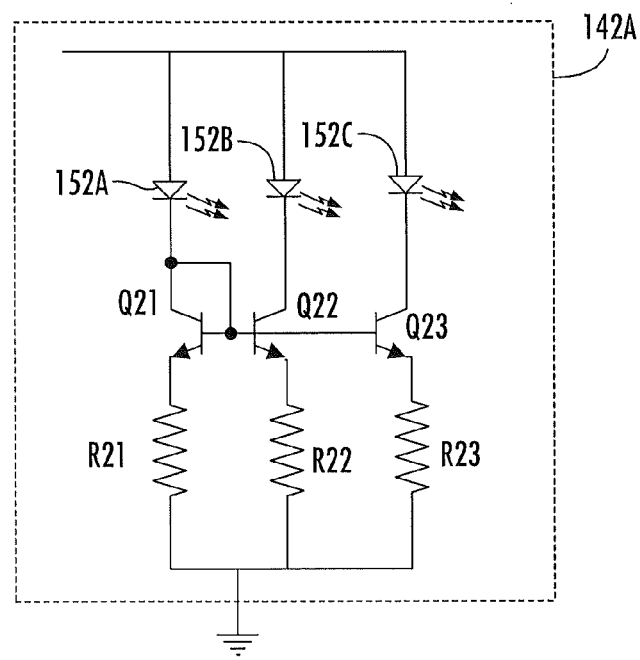

In some embodiments, several high voltage LED components can be connected in parallel and their currents can be shared with a current mirror as shown in. FIG. 8C, which illustrates an embodiment of a first high voltage LED component 142A, which could include BSY and/or red LEDs. The high voltage LED component 142A includes first to third high voltage LED components 152A, 152B and 152C connected in parallel to a current mirror including transistors Q21, Q22, Q23 and resistors R21, R22 and R23. The high voltage LED component 142A can be connected to the output of the boost converter 20 as usual. If R21=R22=R23, the current is split equally in all three components.

An off-line boost converter according to some embodiments is driven in constant power mode to present a substantially constant resistive load to the AC supply line when driving a high voltage LED string. In particular, the LED string voltage may be about 170V to about 240V.

In some embodiments, a power factor compensating (PFC) boost converter for an LED driver circuit does not draw bias or housekeeping power from the auxiliary winding of the boost converter. Rather, it may draw the auxiliary power from bottom of the LED string or from the drain node of the switch. Moreover, a PFC boost converter for an LED driver according to some embodiments may not use feedback from the LED voltage (VOUT) to control the converter.

Figure 9:
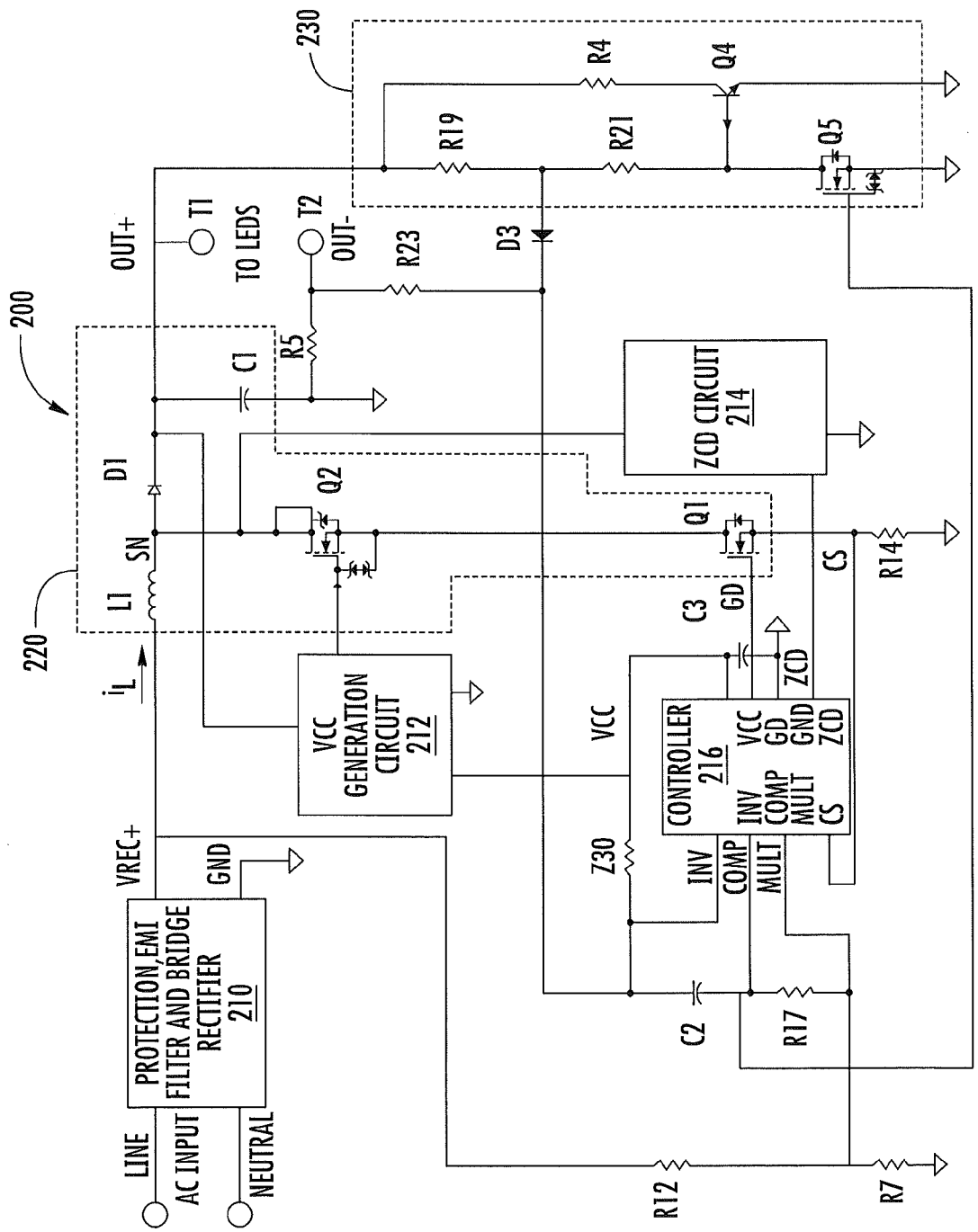
FIG. 9 is a circuit diagram illustrating a solid state lighting apparatus according to still further embodiments.

FIG. 9 is a simplified schematic diagram of a boost converter according to still further embodiments that is configured to convert an AC voltage (typically 120 VAC, 60 Hz) into a high DC voltage (typically 230 VDC) to drive a high-voltage LED array from terminals T1, T2. The AC input voltage is connected to a circuitry block 210 which includes protection circuitry, such as a fuse and a varistor, an EMI filter and a bridge rectifier. The output of the circuitry block 210 is a full wave rectified sinusoidal voltage VREC+. A boost converter 220 is formed by the boost inductor L1, the boost diode D1, transistor switches Q1 and Q2, and the output capacitor C1. The transistor switches Q2 (high voltage MOSFET) and Q1 (low voltage MOSFET) are connected in a cascode configuration.

Operation of the boost converter 220 is controlled by a controller 216, which is coupled to the gate of the transistor switch Q1 through a gate drive line GD. The controller 220 includes a current sense input CS, an inverter input INV, a comparator input COMP, a multiplier input MULT, a zero cross detection input ZCD, along with power (VCC) and ground (VCC) inputs.

The current sense input CS senses current through a current sense resistor R14 coupled to the source of the transistor switch Q1.

The MULT input receives a voltage from a voltage divider formed by resistors R12 and R7 that follows the voltage VREC+. One function of the voltage signal at the MULT input is to shape the input current of the boost converter like the shape of the rectified voltage, i.e. a haversine in this case. Another function of this voltage signal is to define the operating point of the converter in steady state within the operating parameters of the controller. The MULT input to the controller is used in combination with COMP signal to derive a current reference for the transistor peak current.

The ZCD input receives a signal from a zero cross detection circuit 214. This signal is used to initiate a new switching period The COMP output generates an error compensation signal which is internally used along with MULT input signal to derive the current sense reference voltage. The COMP output is adjusted by the controller in steady state at nominal operating point so as to regulate the output current of the boost converter.

A VCC generation circuit 212 provides bias power to the controller 216 through the VCC input during startup and normal operation. The controller 216 may be a standard transition mode controller offered by various IC manufacturers, one example being the L6561 by STMicroelectronics.

The controller 216 and the associated control circuitry provide switching signals to the transistor switch Q1 so that as it switches on and off, the transistor Q2 is switched on and off as the gate of the transistor Q2 is held at a relatively constant higher potential (typically around 18 V). As the transistor switches Q1 and Q2 turn on and off, energy is stored in the boost inductor L1 and delivered to the output capacitor C1 through the boost diode D1 respectively. When the transistor switch Q1 switches on, the inductor current through boost inductor L1 that is ramping up from zero creates a voltage across the current sense resistor R14. When this voltage at the CS pin reaches a predefined threshold, the controller 216 switches off the transistor Q1. The energy in the boost inductor L1 is diverted briefly to the VCC generation circuitry 212 through the source terminal of Q2 and then to the output capacitor C1 through the boost diode D1 when Q2 switches off. When the inductor current through L1 drops to zero, the ZCD (Zero Cross Detection) circuit 214 provides a signal to the controller 216, causing it to initiate the next turn on of the transistor Q1. The VCC generation circuit 212 and the ZCD circuit 214 are described in detail in co-pending and commonly assigned U.S. application Ser. No. 13/462,388, entitled "DRIVER CIRCUITS FOR DIMMABLE SOLID STATE LIGHTING APPARATUS", filed May 2, 2012, the disclosure of which is incorporated by reference.

A boost converter 200 according to some embodiments may be advantageous for use in a triac dimmable LED driver application. For example the closed loop and saturated loop control method of the boost converter 200 may be suitable for use with a triac dimmable solid state lighting apparatus.

As noted above, in triac dimming (also referred to as phase cut dimming), an AC waveform is clamped at zero for part of its conduction angle. As illustrated in FIG. 1, the amount of the phase of an AC signal that is clamped at zero is related to the conduction angle over which the triac is turned on. In the example shown in FIG. 1, the triac is turned on for 120° of the 180° phase of the half-cycle. If the triac were turned on for all 180° of the 180° half cycle, then no dimming occurs; likewise, if the triac were turned on for 0° of the 180° half cycle, then the light is effectively turned off.

For example, referring again to FIG. 9, when the converter 200 is operated without a dimmer or with a dimmer at or near 180° (full conduction angle), the controller 216 is configured to regulate the LED current by sensing the voltage across the LED current sense resistor R5. In steady state, the voltage across the current sense resistor R5 is equal to the internal reference of the controller's error amplifier, which may be about 2.5 V. This voltage level can cause some power loss, but may save the cost of having to provide an additional amplifier. Alternatively, the resistance value, voltage signal and power loss of the current sense resistor R5 can be reduced at the expense of an additional amplifier to amplify the signal.

This control method ensures that during normal operation, the LED current, and thus the light output, is always maintained at a constant level and will not change (in steady state) when the input voltage changes over a certain range (typically 108-132V). This control method uses resistor R23, capacitor C2 and the internal error amplifier in the controller 216 as a part of the feedback and compensation network.

When the input voltage decreases, the controller 216 demands more input current, which results in a voltage increase at the output of the error amplifier, i.e. at the COMP pin of the controller 216. This results in a higher current reference at the CS pin and higher inductor current. At a certain point defined by the internal parameters of the controller 216, the voltage at the COMP pin of the controller 216 will be clamped internally. At this point, the maximum input current will be limited, and hence the output current will fall out of regulation if the input voltage decreases further.

With phase cut dimmers, the effective input voltage is reduced as the dimmer angle drops, and as result the output current drops and dimming is achieved when the maximum input current is reached.

In some embodiments, the peak inductor current $i_L$ may be limited using an internal current clamp in the controller 216. In particular, in addition to the above control method, the circuit 200 may use a higher than nominal value of resistance for the resistor R14, which is the MOSFET or inductor current sense resistor. This allows the converter 200 to be designed such that during nominal operation, the peak inductor current is clamped near the peak of the line cycle for a predetermined duration of time. An appropriate selection of R14 can help to ensure that the input current power factor is not affected significantly. The resulting average input current waveforms are seen in the waveforms shown in FIGS. 10A and 10B.

Figure 10A:
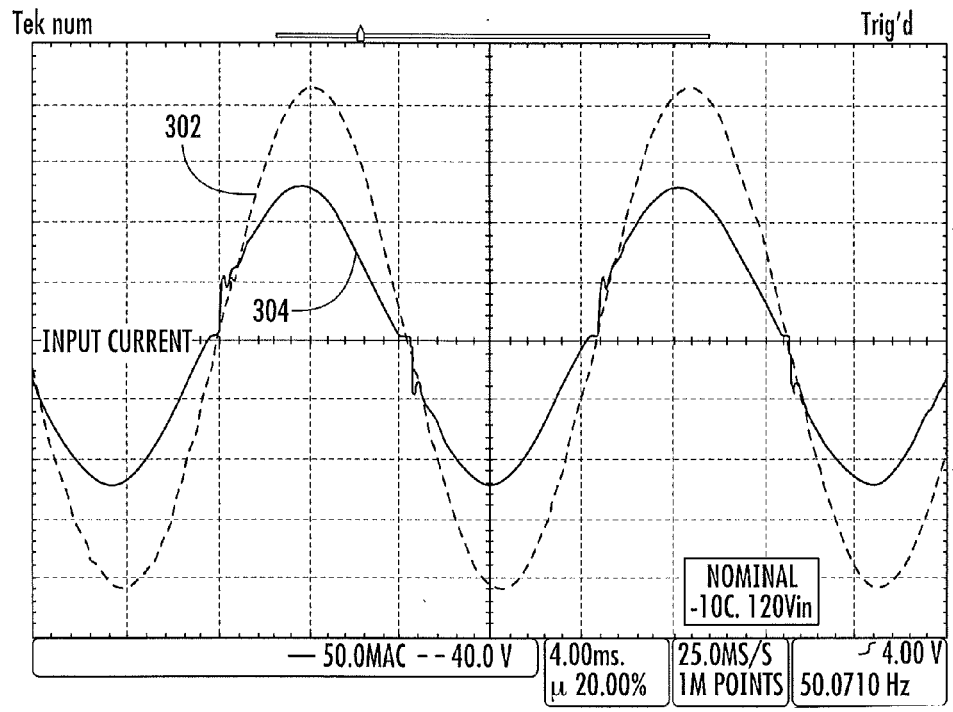
FIGS. 10A and 10B illustrate clamping of inductor current in a driving circuit for a solid state lighting apparatus according to some embodiments.
Figure 10B:
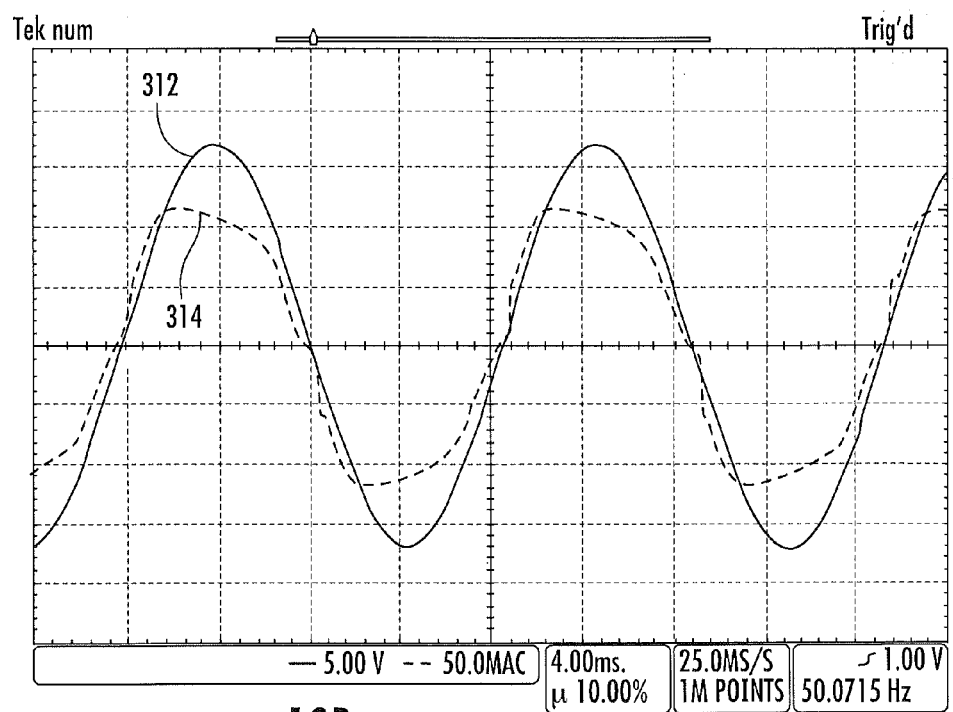

FIG. 10A is a graph of input voltage 302 and input current 304 that illustrates conventional input current shaping. This current shaping can produce a very high power factor. FIG. 10B illustrates a graph of input voltage 312 and input current 314 that illustrates clamped inductor current shaping according to some embodiments.

Figure 11:
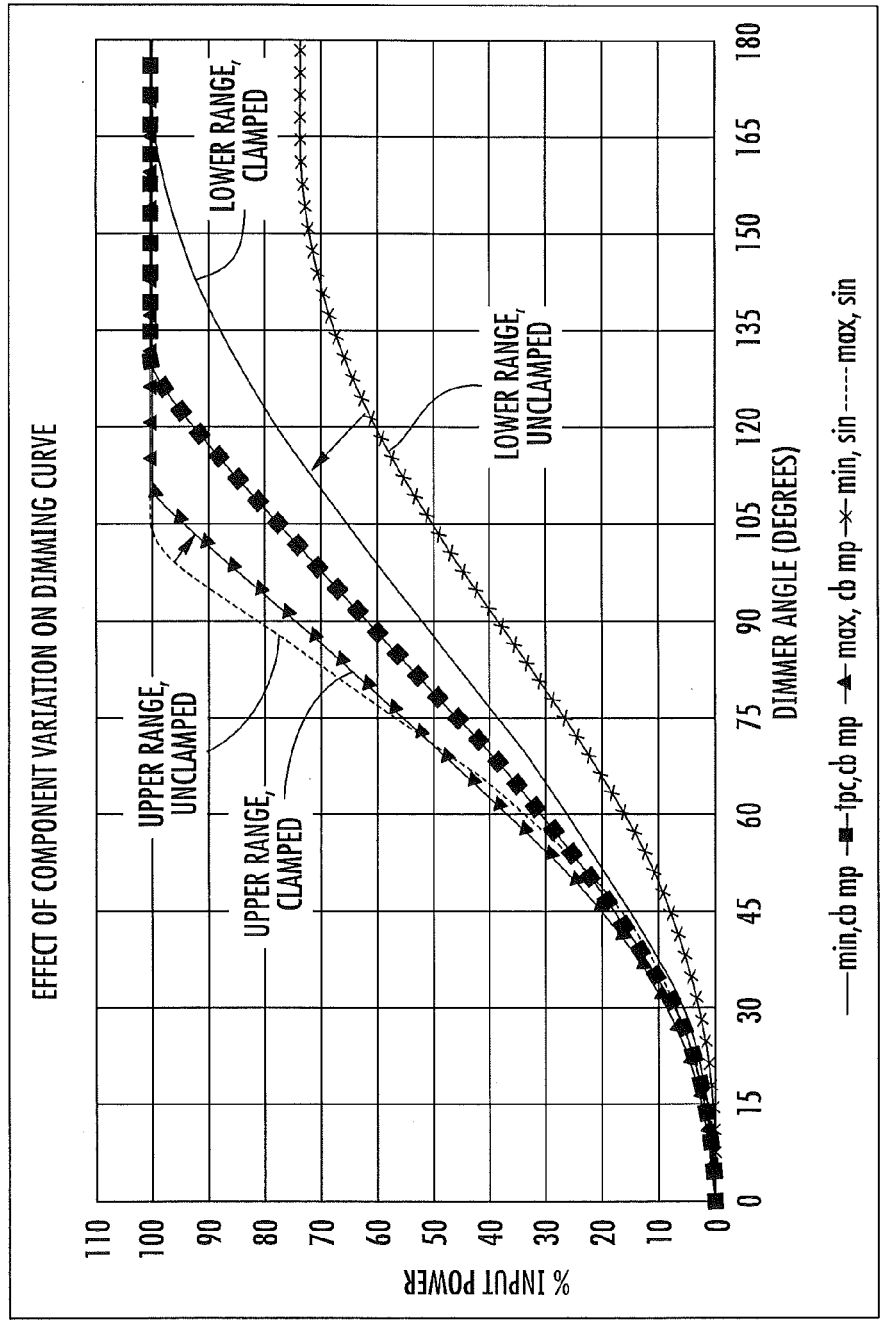
FIG. 11 illustrates the effect of component variation on a dimming curve of solid state lighting apparatus according to various embodiments.

Clamping the inductor current may have the additional benefit of preventing or reducing saturation of the boost inductor L1, which can provide protection against variations in component values. For example, FIG. 11 is a graph of input power (which is analogous to light output) as a function of the triac dimmer angle for different possible values of component tolerances. The tolerance variations take into account variations in temperature, resistor values, inductor value, the internal clamp voltage of the controller, input voltage and other parameters. Clamping the inductor current tightens the tolerance range from the unclamped upper and lower ranges shown in FIG. 11 to the clamped upper and lower ranges. Having a lower variation in tolerance can increase LED driver yields, as there may be fewer drivers that cannot produce full power and/or do not respond quickly to the dimmer.

In some embodiments, the circuit 200 may be configured to clamp the current around the peak of the line for at least 10 degrees of the conduction cycle. In further embodiments, the circuit 200 may be configured to clamp the current around the peak of the line for at least 20 degrees of the conduction cycle. In still further embodiments, the circuit 200 may be configured to clamp the current around the peak of the line for at least 30 degrees of the conduction cycle.

Another feature of the boost converter illustrated in FIG. 9 is that the resistor R17 adds an offset voltage to the multiplier signal, which helps in the case of triac dimming to avoid flicker at low dimming angles. The multiplier (MULT) pin of the controller 216 receives a signal proportional to the rectified AC voltage at VREC+ that is divided down to a suitable voltage by resistors R12 and R7. The MULT pin signal along with the COMP signal is used to generate a current reference signal in the controller 216.

During dimming, when the dimmer triac is off, it is desirable for the switches Q1 and Q2 to be in the ON state in order to allow the dimmer leakage current to have a closed path. At the same time, it is not desirable to trigger the current sense (CS) pin of the controller 216 and cause the switches Q1 and Q2 to turn on and off, which can cause intermittent delivery of energy to the output and hence light flicker. To ensure this, the resistor R17 adds a known current from the COMP pin (which is saturated) to the MULT pin and keeps the reference voltage on the CS pin higher than IDL*R14, where IDL is the anticipated dimmer leakage current.

The resistor R17 could alternatively be connected to the VCC input of the controller 216. However, connecting the resistor R17 to the COMP pin also helps to keep the offset low during normal operation when the COMP pin is not saturated high and is at a lower voltage.

Some embodiments additionally include a discharge and over-voltage protection (OVP) circuit 230. In the boost converter of FIG. 9, discharge and over-voltage protection circuit 230 includes the resistors R19, R21 and R4 and the transistors Q4 and Q5. When the input power is cut off, it is beneficial to discharge the energy stored on the output capacitor C8 using discharge circuitry for several reasons. For example, turn off can be slow and visible when the capacitance of the output capacitor C8 is high. In addition, several leakage paths can exist in a high voltage array, and a turn-off flash could occur if the voltage is allowed to discharge over a long period of time. Further, although the user access to the LEDs is typically restricted in a solid state luminaire, it may be beneficial to bring the voltage on the LED terminals below a safe level (e.g. below 50 V) as quickly as possible.

A boost converter according to some embodiments combines the over-voltage protection (OVP) circuitry and the discharge circuitry such that the number of components used and/or power loss may be reduced. During normal operation when the input power is present and the controller is running, the transistor Q5 is on and the transistor Q4 is off. The resistor divider R19-R21 along with diode D3 set the level of OVP triggering. When the output voltage exceeds a predetermined voltage, the diode D3 is forward biased. This raises the voltage at the INV pin of the controller 216, which causes the controller 216 to limit the energy throughput and reduces the output voltage. When the input power is disconnected and the controller 216 loses its bias power at the VCC pin, the COMP pin voltage drops to zero. This turns off the transistor Q5, and R19-R21 now supply a voltage to the base of Q4, turning it on. The energy stored on the output capacitor C8 is then dissipated in the resistor R4 and the transistor Q4.

An impedance Z30 is provided between the VCC pin and the NV pin of the controller 216. The impedance Z30 could be a resistor or a resistor-capacitor combination that could help in soft-start for the controller.

A boost converter according to some embodiments may also utilize the output voltage (OUT+) instead of the rectified input voltage to draw power for startup, i.e. to energize the VCC pin of the controller 216. This also ensures that during dimming, especially during low dimming angles, there is a continuous supply of current from the output to keep VCC high enough for normal operation of the controller 216.

Many aspects of the circuits and methods illustrated in FIG. 9 are not limited to use in a boost converter, but could be used in a buck, buck-boost, flyback or other similar converter.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A driving circuit for a solid state lighting apparatus, comprising:
 a full wave rectifier configured to rectify an alternating current (AC) input voltage signal to generate a rectified input signal;
 a boost conversion circuit configured to receive the rectified input signal and deliver power to a solid state light source at a voltage higher than a peak voltage of the rectified input signal; and
 a boost control circuit coupled to the boost conversion circuit and configured to cause the boost conversion circuit to draw a substantially constant power from the rectified input signal and transfer the power to the solid state light source at a voltage level defined by the solid state light source.

2. The driving circuit of claim 1, wherein the boost control circuit is configured to operate in an open loop control mode wherein operation of the boost conversion circuit is not controlled in response to a level of the output voltage signal.

3. The driving circuit of claim 1, wherein the boost control circuit is configured to generate a current reference for controlling the boost conversion circuit in response to the rectified input signal.

4. The driving circuit of claim 1, wherein the boost control circuit is configured to operate in a constant on time boundary conduction mode.

5. The driving circuit of claim 1, wherein the boost control circuit is configured to operate in a constant off time continuous conduction mode.

6. The driving circuit of claim 1, wherein the boost conversion circuit comprises a boost inductor configured to receive the rectified input signal, a diode coupled to the boost inductor, a boost capacitor coupled to the diode, and a switch coupled to the boost inductor and the diode, wherein operation of the switch is controlled by the boost control circuit, wherein the boost inductor comprises an auxiliary winding, and wherein the boost control circuit is coupled to the auxiliary winding of the boost inductor and configured to generate a current reference for controlling operation of the switch in response to a voltage developed across the auxiliary winding of the boost inductor.

7. The driving circuit of claim 6, wherein the boost control circuit is configured to draw bias power from a source other than the auxiliary winding of the boost inductor.

8. The driving circuit of claim 1, wherein the boost conversion circuit comprises a boost inductor configured to receive the rectified input signal, a diode coupled to the boost inductor, a boost capacitor coupled to the diode, and a MOSFET switch comprising a drain terminal coupled to the boost inductor and the diode, a source terminal coupled to the boost control circuit, and a gate terminal coupled to the boost control circuit, wherein the driving circuit is configured to draw bias power from the drain terminal of the MOSFET switch.

9. A solid state lighting apparatus, comprising:
a solid state lighting source including a solid state light emitting device; and
a driving circuit coupled to the solid state lighting source and comprising a full wave rectifier configured to rectify an alternating current (AC) input voltage signal to generate a rectified input signal, a boost conversion circuit configured to receive the rectified input signal and responsively generate a direct current (DC) output voltage signal and to supply the output voltage signal to a solid state light source, and a boost control circuit coupled to the boost conversion circuit and configured to cause the boost conversion circuit to operate in a constant power mode in which the boost conversion circuit draws a substantially constant power from the rectified input signal and transfers the power to the solid state lighting source at a voltage level defined by the solid state lighting source.

10. The solid state lighting apparatus of claim 9, wherein the solid state lighting source comprises a first light emitting diode component configured to emit light having a first color and a second light emitting diode component configured to emit light having a second color that is different from the first color, wherein the first and second light emitting diode components are connected in a current mirror configuration.

11. The solid state lighting apparatus of claim 10, wherein the first and second light emitting diode components are connected in parallel.

12. The solid state lighting apparatus of claim 10, wherein the first and second light emitting diode components are connected in series.

13. The solid state lighting apparatus of claim 12, wherein the solid state lighting source comprises a first transistor and a second transistor coupled in a current mirror configuration with base contacts of the respective transistors coupled to a common node, coupled to a cathode of the second light emitting diode component, and coupled to a collector of the first transistor, wherein a collector of the second transistor is coupled to an anode of the second light emitting diode component and to a cathode of the first light emitting diode component.

14. The solid state lighting apparatus of claim 12, wherein the solid state lighting source comprises a first transistor and a second transistor coupled in a current mirror configuration with base contacts of the respective transistors coupled to a common node and coupled to a collector of the second transistor, and a third transistor having an emitter coupled to the common node and a base coupled to a collector of the first transistor, wherein a collector of the third transistor is coupled to an anode of the second light emitting diode component and to a cathode of the first light emitting diode component, and wherein the cathode of the second light emitting diode component is coupled to the collector of the first transistor.

15. The solid state lighting apparatus of claim 9, wherein the solid state lighting device comprises a plurality of light emitting diodes configured to emit light having a first color and coupled a current mirror configuration.

16. A method of generating an input voltage signal for powering a solid state light source, comprising:
rectifying an alternating current input voltage to form a rectified input signal;
boosting the rectified input signal and converting the rectified input signal to direct current to form an output voltage signal; and
supplying the output voltage signal to the solid state light source;
wherein boosting the rectified input signal is performed in a constant power mode.

17. The method of claim 16, wherein the boosting the rectified input signal is performed in an open loop control mode.

18. The method of claim 16, further comprising generating a current reference for controlling the boosting of the rectified input signal in response to the rectified input signal.

19. The method of claim 16, wherein boosting of the rectified input signal is performed using a boost control circuit configured to operate in a constant on time boundary conduction mode.

20. The method of claim 16, wherein boosting of the rectified input signal is performed using a boost control circuit configured to operate in a constant off time continuous conduction mode.

21. A driving circuit for a solid state lighting apparatus, comprising:
a voltage boost circuit including a boost inductor, a boost diode coupled to the boost inductor, an output capacitor coupled to the boost diode and a switch coupled between the boost inductor and ground;
a first output terminal coupled to the output capacitor and configured to be connected to an anode terminal of a solid state lighting circuit;
a second output terminal configured to be connected to a cathode terminal of the solid state lighting circuit;
a controller coupled to the switch and configured to control operation of the switch in response to an inductor current through the boost inductor and a load current through the solid state lighting circuit.

22. The driving circuit of claim 21, wherein the controller is configured to turn off the transistor switch when the current through the boost inductor reaches a predetermined threshold.

23. The driving circuit of claim 22, further comprising a zero cross detection circuit configured to generate a zero cross detection signal in response to detecting a zero crossing of the current through the boost inductor, wherein the controller is configured to turn the transistor switch on in response to the zero cross detection signal.

24. The driving circuit of claim 21, wherein the controller is configured to clamp the current through the boost inductor at a predetermined level.

25. The driving circuit of claim 24, wherein the controller is configured to clamp the current through the boost inductor around a peak of the input voltage signal for at least 10 degrees of a conduction cycle of the input voltage level.

26. The driving circuit of claim 25, wherein the controller is configured to clamp the current through the boost inductor around a peak of the input voltage signal for at least 20 degrees of a conduction cycle of the input voltage level.

27. The driving circuit of claim 26, wherein the controller is configured to clamp the current through the boost inductor around a peak of the input voltage signal for at least 30 degrees of a conduction cycle of the input voltage level.

28. The driving circuit of claim 21, further comprising a discharge circuit coupled to the first output terminal and configured to discharge a voltage on the output capacitor in response to a loss of input voltage.

* * * * *